United States Patent [19]

Hartmann et al.

[11] Patent Number: 4,837,898
[45] Date of Patent: Jun. 13, 1989

[54] APPARATUS FOR CLEANING THE ABDOMINAL CAVITY OF FISH

[75] Inventors: Franz Hartmann, Bad Oldesloe; Dieter Wulff, Lübeck, both of Fed. Rep. of Germany

[73] Assignee: Nordischer Maschinenbau Rud. Baader GmbH+CO KG, Lubeck, Fed. Rep. of Germany

[21] Appl. No.: 206,618

[22] Filed: Jun. 14, 1988

[30] Foreign Application Priority Data

Jun. 19, 1987 [DE] Fed. Rep. of Germany ....... 3720253

[51] Int. Cl.⁴ .............................................. A22C 25/14
[52] U.S. Cl. ......................................................... 17/58
[58] Field of Search ................................ 17/58, 52, 61

[56] References Cited

U.S. PATENT DOCUMENTS 1,223,468  4/1917  Brierly et al. ............................ 17/58
2,054,576  9/1936  Waugh .................................... 17/58
2,526,150  10/1950  Oates ...................................... 17/58
3,964,132  6/1976  Backhaus et al. ...................... 17/57

Primary Examiner—Willie G. Abercrombie
Attorney, Agent, or Firm—Thomas R. Morrison

[57] ABSTRACT

An apparatus for gutting fish makes use of a tool driven to revolve. Starting from the idea of a combined slitting tool for opening the abdominal cavity and cleaning tool for removing the viscera, it is proposed to prevent the thereby unavoidable damage to the abdominal skin covering the sides of the abdominal cavity by designing the tool solely as a cleaning tool and equipping it with laterally associated spreaders. The latter are constructed as hollow elements and provided with nozzle bores in their flanks facing the cleaning tool and have a water connection through which water can be led to the nozzle bores with the effect that the water jets keep the belly spread apart when the cleaning tool enters the abdominal cavity.

6 Claims, 1 Drawing Sheet

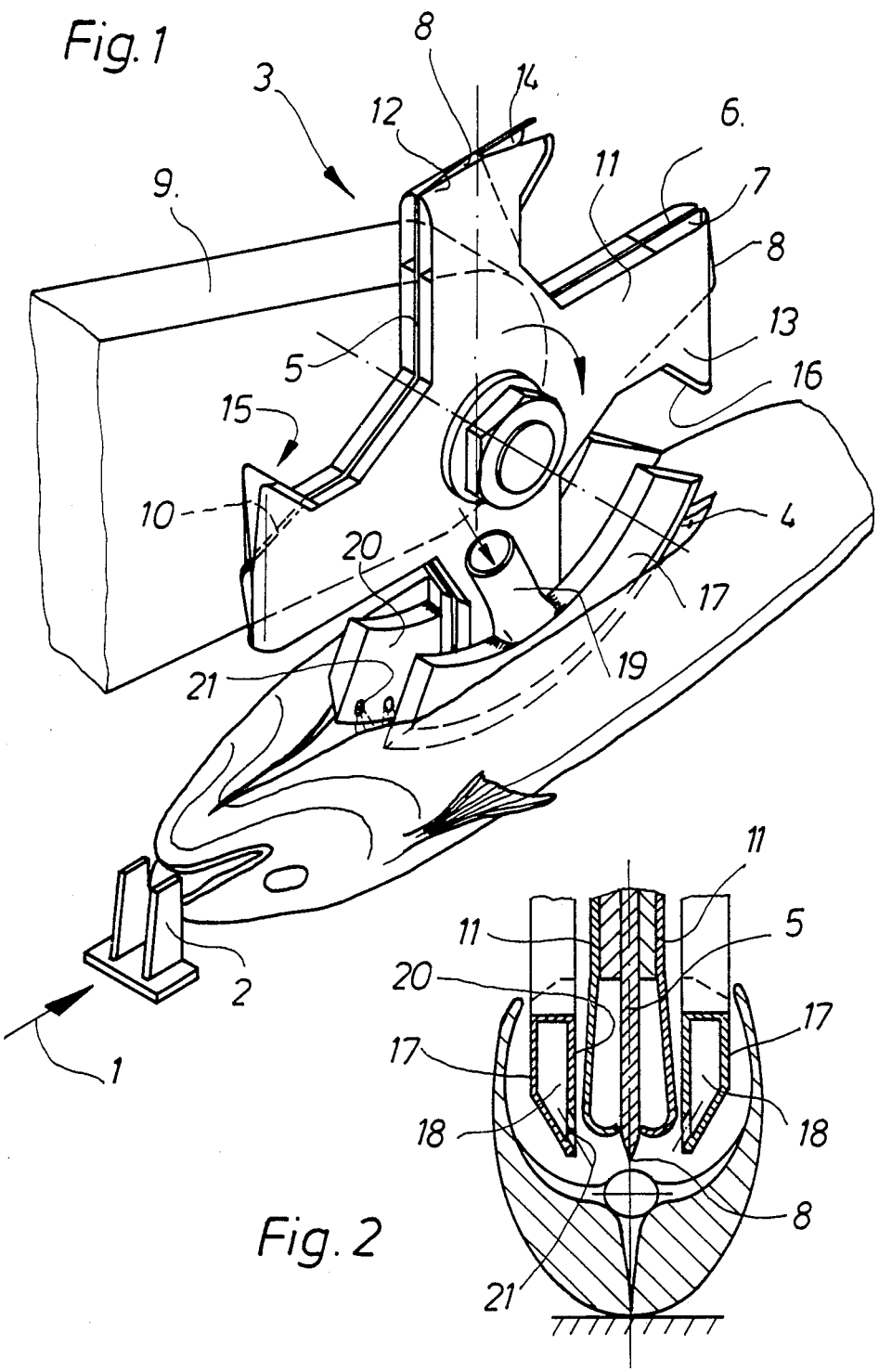

APPARATUS FOR CLEANING THE ABDOMINAL CAVITY OF FISH

BACKGROUND OF THE INVENTION

1. Field of the Invention

The invention relates to an apparatus for cleaning the abdominal cavity of fish, comprising a tool driven to revolve in a predetermined direction for removing the viscera or intestines, the viscera removal tool including a knife blade with a peripherally arranged cutting edge for opening the air bladder or kidneys and, for tearing away the viscera, being provided with lateral cleaning means in the vicinity of the cutting edge.

In such apparatuses, it is an essential requirement to remove the viscera completely and to open the air bladder, if present, and kidneys reliably and, at the same time, to leave the abdominal skin giving a certain protection against bacterial attacks undamaged. In addition, this result is to be achieved reliably for fish of different species, types and sizes, without the requirement of making significant changes to the apparatus.

2. Prior Art

Numerous attempts have been made to meet these in part diametrically opposing requirements with a single tool, but the results hitherto obtained have not been satisfactory.

Danish Pat. No. 146 972 discloses a tool which is able to satisfy reliably the first two requirements, namely the removal of the viscera and the opening of the air bladder and kidneys, but it is unable to prevent damage to the abdominal skin, particularly when processing fish which is not absolutely fish. The result which has had to be accepted up to now through the lack of better concepts and designs was that the abdominal walls were roughened and the cut surfaces of the belly opening cuts were torn to a greater or smaller extent.

The construction of this known tool corresponds to that described in the introductory paragraph.

3. Objects of the Invention

It is a main object of the invention to propose a tool for cleaning the abdominal cavity of fish, which does not suffer from the aforementioned disadvantages.

It is a particular object of the present invention to suggest a tool which enables the processing of fish of differing types and sizes reliably without necessitating major structural changes or adjustments to the tool itself during application.

SUMMARY OF THE INVENTION

In an apparatus comprising a tool driven to revolve in a predetermined direction for removing the viscera, which viscera removal tool (also termed "cleaning tool" hereinafter includes a knife blade with a peripherally arranged cutting edge for opening the air bladder and/or the kidneys and, for tearing away the viscera, is provided with lateral cleaning means in the vicinity of the cutting edge, these objects are achieved, according to the present invention, in that one stationary spreader, each, is associated with the two flanks of the cleaning tool, which stationary spreader has a substantially circular-segmental configuration, whose external diameter substantially corresponds to the revolving path of the cutting edge of the knife blade, and which is arranged in a region of the cleaning tool facing the fish to be processed.

The attainable advantages are, in particular, that on the arrival of the fish, whose abdomen has been opened in a preceding operation by a cut made in the plane of symmetry up to the anus, the belly flaps are spread apart, so that there is no contact between the latter and the rotating part of the cleaning tool.

This effect can be improved advantageously in conjunction with an additional cleaning effect in that the spreader, when seen in a radial direction, has a wedge-shaped cross-section tapering towards its periphery and surrounding a cavity and that means are provided for supplying fluid such as water to said cavity, which fluid is passed through nozzle holes arranged on the inner flanks or walls of the spreader in the vicinity of its periphery and with a substantially radial orientation. In order to achieve the desired reliability of cleaning as well, the knife blade may preferably comprise at least one radially extending knife blade member, whose leading edge is blunt, while the lateral spreaders may be constructed as cover plates arranged substantially parallel and spaced from the knife blade member, these cover plates being bent towards the knife blade member in the region of their peripheral ends and together comprising a part located upstream of the leading edge of the knife blade member, which part, when seen in a radial direction, forms, in the vicinity of the bent ends, a V-shaped clamping gap open against the direction of movement, closed at its base by the leading edge of the knife blade member and over which projects the peripheral cutting edge of the knife blade member.

According to another advantageous embodiment, the part of the cover plates located upstream of the leading edge of the knife blade member is provided with cutting edges on its leading edges.

BRIEF DESCRIPTION OF THE DRAWINGS

Other and further objects of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings FIG. 1 shows a view of the cleaning tool according to the invention in an axonometric representation without showing the machine as such, FIG. 2 shows a cross-section through the working area of the apparatus in a position in which the apparatus is immerged into the fish.

DETAILED DESCRIPTION OF THE PREFERRED EMBODIMENT

In a not shown fish gutting machine frame there is arranged a suitable conveyor 1 equipped with entrainers 2 for the fish lying on their backs and being advanced tails first by engagement at their head ends. Upstream of a cleaning or gutting tool 3 serving to remove, i.e. eviscerate, the viscera or intestines and to be described herein in detail, there is provided a not shown slitting tool for opening the abdominal cavity ensuring the opening thereof between the tail side end 4 of the abdominal cavity and the isthmus. The cleaning tool 3 is driven to revolve in an appropriate manner and includes a knife blade 5 in the form of radially arranged knife blade members 6, which, on their peripheral ends 7, are provided with cutting edges 8 aligned in a common revolving plane and path. The cleaning tool 3 is mounted on an only intimated gear rocker arm 9, which is arranged to be controlled in an appropriate manner timed with the entrainers 2 to lower into the abdominal cavity upon arrival of the end 4 thereof and to be raised out again in the region of the head end of the fish. The knife blade members 6 are blunt at their leading edges 10 and are provided, on their two flanks, with substantially parallel cover plates 11 at a distance of e.g. 5 mm therefrom. In the vicinity of their peripheral ends 12, the cover plates 11 are bent over towards the knife blade members 6 until they engage therewith so that, considered in radial cross-section, one tunnel each, subdivided by the said knife blade members 6, respectively, results. In the region of said tunnel the cover plates 11 form a part 13 positioned upstream of the leading edge 10 of the knife blade member 6 and constitute pairwise, in the region of the bent over ends 12, a radially directed, V-shaped clamping gap 14 closed at its base by the leading edge 10 of the knife blade members 6. The peripheral cutting edges 8 project slightly, e.g. by 4 mm, over this gap. The part positioned upstream of the leading edges 10 of the knife blade members 6 has, seen from the side, roughly the shape of an isosceles right-angled triangle, whose hypotenuse forming the leading edge 15 is provided with a cutting edge 16. With the two flanks of the cleaning tool 3 is associated one spreader 17, each, having the configuration of a circular ring segment and being arranged stationary with respect to the tool. The external diameter of each spreader 17 corresponds to the diameter of the revolving path of the cutting edges 8 of the knife blade members 6. The spreaders 17 are arranged in the working area of the cleaning tool 3 and, when looked at in a radial direction, have a wedge-shaped cross-section tapering towards their periphery and surrounding a correspondingly shaped cavity 18. Each of the cavities 18 of the spreaders 17 is connected to a water supply 19 and is provided in its inner flank 20, i.e. the wall facing the cleaning tool 3, with approximately radially oriented nozzle holes 21 in the vicinity of the periphery of spreaders 17.

The function of the apparatus is as follows:

A fish prepared by opening the abdominal cavity in the area between the isthmus and the anal side abdominal cavity end arrives in the region of the cleaning tool 3 in a position lying on its back and being pushed by the entrainer 2 engaging on its head end. The tool 3 is initially in the raised position. During the further conveying action, the cleaning tool 3 is lowered by means of the gear rocker arm 9 in the direction of the abdomen of the fish facing the tool, the lowering movement being controlled in such a way that the cleaning tool 3, together with the laterally associated spreaders fixed to the gear rocker arm 9, immerges into the fish in the region of the anus. During the approaching action thereof, already, the water jets coming out of the nozzle bores 21 provided in said inner flanks 20 have, as a result of their orientation, effected that the belly flaps separated from each other are forced apart, which partly occurs by direct jet action and partly by the weight or pressure of the water accumulating in the abdominal cavity. Thus, the cleaning tool 3 can enter the abdominal cavity without the revolving part of the tool coming into contact with the belly flaps. The lowering movement is continued until the cutting edges 8 of the knife blade members 6 engage with the vertebral column, which takes place shortly after the cutting edges 8 have penetrated and slit open the possibly present air bladder and the kidneys or the bloodstream. The removal of the viscera now takes place by the scraping and tearing away action of the cleaning tool 3. As a result of the presence of relatively large quantities of water the blood and viscera residues are flushed out and the abdominal cavity walls are cleaned. When the cleaning tool 3 has reached the head region of the fish it is controlled to move out of the latter again by means of the gear rocker arm 9 and, for reasons of economy, the water supply can be shut off until the next fish arrives.

What is claimed is:

1. An apparatus for processing fish having an abdominal cavity which has been opened in a previous processing step, in which cavity viscera, and at least one of an air bladder and kidneys are present, which apparatus comprises
   (a) tool means driven to revolve in a predetermined revolving direction for removing said viscera, which viscera-removing tool means define two flanks and comprise
      (aa) knife blade means, which define peripherally arranged cutting edge means for opening said at least one of an air bladder and kidneys, as well as
      (ab) lateral cleaning means for tearing loose said viscera and arranged in the region of said cutting edge means, and
   (b) stationary spreader means having a substantially circular-segment configuration, one each of said spreader means being associated with one of said flanks, and an outer diameter which substantially corresponds to the diameter of the path of revolution of said cutting edge means, and being arranged in a region of said viscera-removing tool means which faces said fish to be processed.

2. An apparatus as claimed in claim 1,
   wherein said spreader means have, when looked at in a radial direction of said viscera-removing tool means, a wedge-shaped cross-section tapering towards its periphery and enclosing a cavity, and
   wherein water supply means for supplying water to said cavity are provided, which include nozzle bores, arranged in inner walls of said spreader means in the vicinity of the periphery of said spreader means and having a substantially radial orientation, said water passing through said nozzle bores.

3. An apparatus as claimed in claim 1,
   wherein said knife blade means comprise at least one radially extending knife blade member having a blunt leading edge, and
   wherein said lateral cleaning means are designed as cover plates, which are spaced from said knife blade member, bent towards said knife blade member in the region of their peripheral end and together include a part located upstream of said leading edge of said knife blade member, which upstream part, when viewed in a radial direction of said revolving viscera-removing tool means, forms, in the region of said bent ends, a V-shaped clamping gap open against said revolving direction and closed at its base by said leading edge of said knife blade member and over which gap projects the peripheral cutting edge of the knife blade member.

4. An apparatus as claimed in claim 2, wherein said knife blade means comprise at least one radially extending knife blade member having a blunt leading edge, and wherein said lateral cleaning means are designed as cover plates, which are spaced from said knife blade member, bent towards said knife blade member in the region of their peripheral end and together include a part located upstream of said leading edge of said knife blade member, which upstream part, when viewed in a radial direction of said revolving viscera-removing tool means, forms, in the region of said bent ends, a V-shaped clamping gap open against said revolving direction and closed at its base by said leading edge of said knife blade member and over which gap projects the peripheral cutting edge of the knife blade member.

5. An apparatus as claimed in claim 3, wherein said upstream part of said cover plates is provided with cutting edges on its leading edges.

6. An apparatus as claimed in claim 4, wherein said upstream part of said cover plates is provided with cutting edges on its leading edges.

* * * * *